March 23, 1965 T. T. WILKINSON 3,174,405
POSITIVE DISPLACEMENT FLUID MOTOR
Filed May 23, 1962 2 Sheets-Sheet 1

INVENTOR.
THURLAND T. WILKINSON
BY
Adams, Forward and McLean
ATTORNEYS

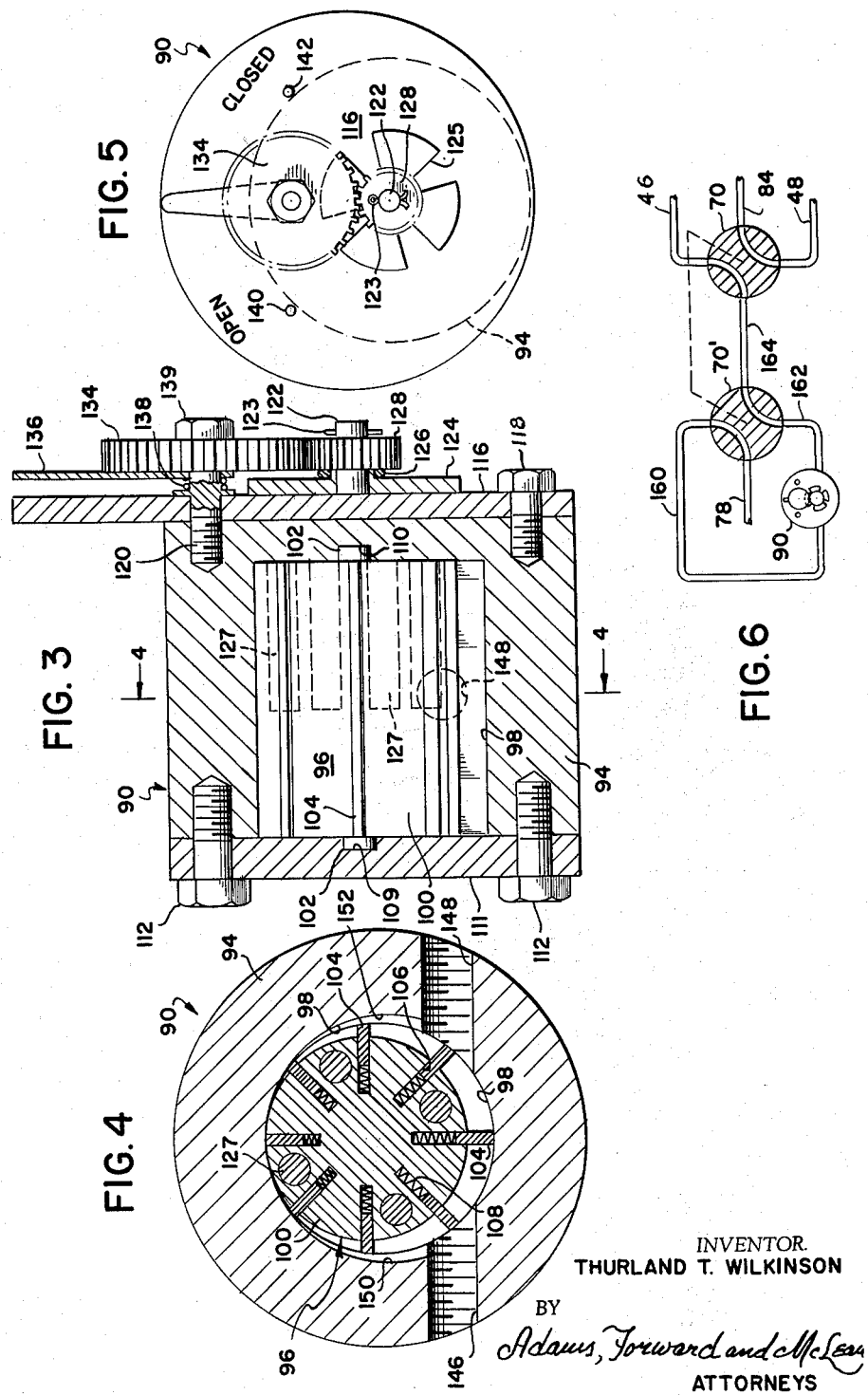

3,174,405
POSITIVE DISPLACEMENT FLUID MOTOR
Thurland Thompson Wilkinson, Princeton, N.J., assignor, by mesne assignments, to Sinclair Research, Inc., New York, N.Y., a corporation of Delaware
Filed May 23, 1962, Ser. No. 197,090
2 Claims. (Cl. 91—1)

The present invention relates to a hydraulic system for controlling and monitoring a remotely positioned valve and to an indicator useful in such a system.

More particularly the present invention relates to a hydraulic system for controlling and monitoring the operation of a valve (hereinafter called a cargo valve) that is located in a position remote from the cargo valve control station, the cargo valve being positioned, for example, in a cargo tank of a marine vessel or the like. In large oil tankers the piping to the various cargo tanks extend through such tanks, and the cargo valves provided to communicate the pumping systems with the individual cargo tanks, and the cargo valves interconnecting the several pumping systems, are located near the bottom of the cargo tanks. Similarly, valves also referred to hereinafter as cargo valves, are also found near the bottom of the ballast tanks. In a typical 50,000 ton tanker 85 such submerged cargo valves can be found.

Until quite recently the cargo and ballast valves were controlled from the deck by means of reach rods extending through the tanks in which the cargo valves are located. These heretofore known manually operated reach cargo valves were objectionable, since they were not only difficult to operate by hand due to often faulty seating and often rusty gears, but in ships that included multiple control valves, the operator had to walk to each control station to operate the associated cargo valve. It is obvious that during a loading operation of the vessel, the operator would experience difficulty in maneuvering to each cargo valve control station and, in addition, if any cargo valves failed to operate, the loading operation would be considerably delayed and hazardous. By controlling the remotely positioned cargo valves by a hydraulic system, ease of operation would be assured and, furthermore, a single control station could be provided for all of the remotely positioned cargo valves.

A hydraulic system for automatically controlling submerged cargo-type valves is disclosed in my copending application Serial No. 183,320, filed March 16, 1962, and incorporated herein by reference. Such a system can be used with particular advantage in association with the present invention. The system described in the copending application employs a fluid operated, reversible, limited movement, positive displacement motor for actuation of cargo valves. The motor, along with a pump and suitable lines constitutes a circuit for the motor fluid. In a circuit having two lines between the pump and motor, reversal of the fluid flow provides for reversing the operation of the cargo valve. In a three-line system, one line is generally used consistently for fluid exhaust from the motor, while fluid flow to the motor is directed through one of the two remaining lines to determine the operation of the valve. A feature of the device of the copending application is the provision made for continuance of the flow of motor fluid through the motor after its limited movement to effect the desired valve actuation has been achieved. In this way, debris, entrained air or other undesired materials may be removed by the motor fluid from the motor and motor fluid lines. A filter or other separating means interposed in the motor fluid circuit can remove these undesired materials from the system. This purging operation enables the motor fluid piping network to maintain maximum flow rates and smooth cargo valve operations. During such purging operations a flow of motor fluid from a hydraulic pump located for example on the deck of the tanker is sent through the motor fluid piping network and is returned to the sump. It is desirable, in controlling and monitoring such purging operations, to be appraised of the position of the remotely positioned cargo valves and to check the flow of motor fluid during such operation.

It is an object of the present invention to provide, in association with a hydraulic system that includes a control station, means adapted to indicate the position of remotely positioned valves controlling the flow of fluid through a network of conduits and to indicate the presence of the continuing flow of motor fluid during a hydraulic line purging operation.

It is also an object of this invention to provide such an indicator having relatively simple construction which can be inexpensively fabricated.

Although the principal object of this invention is directed to submerged valve systems it will be apparent from the description hereinafter that the device of this invention can be utilized other than under submerged conditions and that it can be used for indicating flow systems associated with any fluid where it is desirable to employ reverse flow or continuing flow techniques.

Basically the indicator device of this invention is a reversible, positive displacement meter connected in the line of flow of the motor fluid. The meter is provided with a first indicator which is driven by the meter to indicate both operation of the meter and direction of flow through the meter. A second indicator is associated with the first by a slip connection to it such that the second indicator is driven by the first but can be stopped by an obstruction in the path of its movement. Such an obstruction is provided in the form of a device to limit movement of the second indicator between two pre-determined positions. The amount of movement of the second indicator between such two positions is determined on the basis that the amount of meter displacement required to drive the second indicator between two such positions equals the total displacement of the limited movement of the motor driven by the hydraulic system in which the indicator is connected.

In accordance with this invention the indicator is thus connected in a hydraulic circuit including a reversible, limited movement, positive displacement motor wherein the fluid conduits connecting the motor between a source of pressured fluid and a sump are provided with a valving arrangement having at least two modes of operation. In one mode of operation the fluid pressure source and sump are connected to the motor to drive the motor in one direction and in the second mode, they are connected to drive the motor in the reverse direction. As pointed out above the motor itself is provided with some arrangement associated with it such that at the end of the limited movement of the motor in either direction the fluid pressure source is connected to the sump, preferably through the motor in accordance with the teaching of the above noted copending application.

It will be further apparent that the indicator of the present invention must have its meter connected in the hydraulic circuit such that when valved in the first mode of connection the meter is driven in one direction and in the second mode the meter is driven in the reverse direction.

For a more complete understanding of the practical application of this invention, reference is made to the appended drawings in which:

FIGURE 3 is an enlarged sectional side view of the indicator of this invention;

FIGURE 4 is a sectional view taken along the lines 4—4 of FIGURE 3;

FIGURE 5 is an end elevational veiw of the indicator; and

FIGURE 6 is a schematic diagram of another hydraulic circuit in which the indicator of this invention can be employed.

Figure 1:
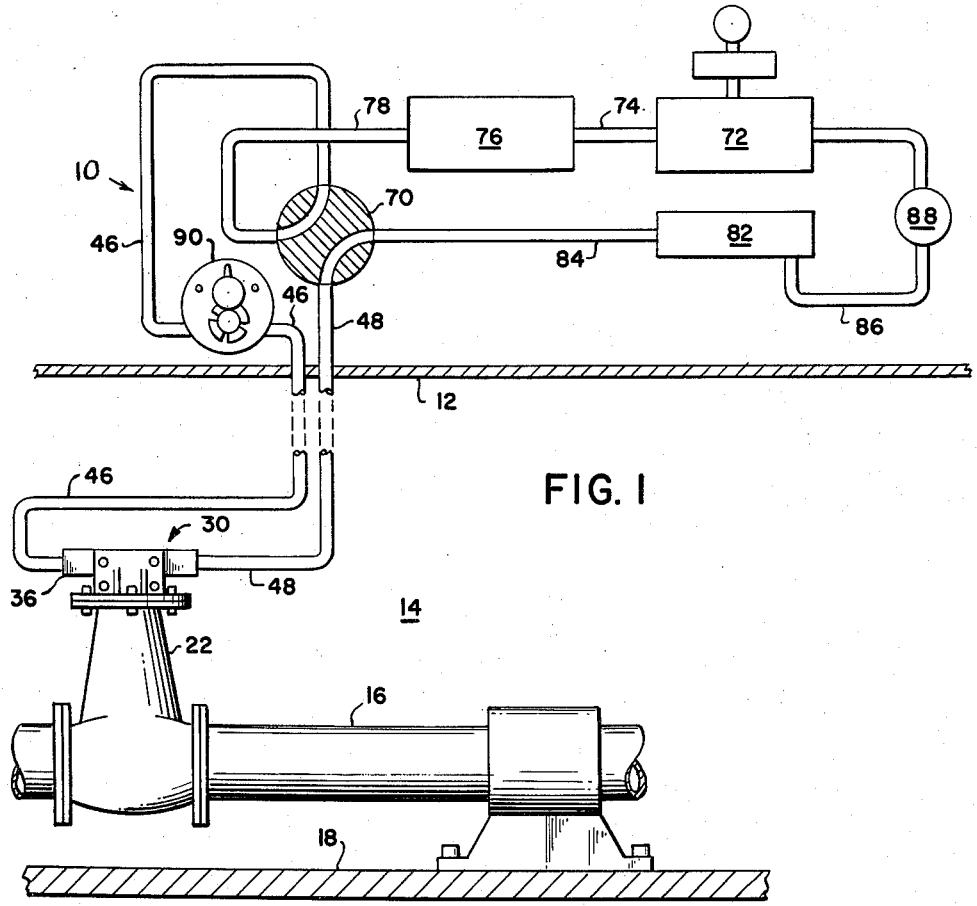
FIGURE 1 is a somewhat schematic elevation of a valve control system utilizing one embodiment of the indicator of this invention.

Referring now to the drawings, FIGURE 1 shows a section through the hull of the marine vessel on which a control system is installed indicated at 10. Extending from the deck 12 of the vessel, into the hold 14 of the vessel, is a control system for a cargo conduit 16, located near the bottom 18 of a cargo tank, that is adapted to convey liquid to and from the ship's tanks. Positioned in the hold is a fluid motor, i.e., valve actuator generally indicated at 30. The motor 30 is mounted, affixed on the body of a valve 22 which valve is included in the conduit 16 and which is of any suitable type, such as a butterfly or plug valve. The valve stem 24 preferably is adapted to be rotatably operated through a 90° angle between fully open and fully closed positions of the valve and at its end remote from the valve extends into motor 30 where it is connected to the operating element 32 of fluid motor 30.

The operating element 32 of fluid motor 30 is a vane which is mounted on valve stem 24 at one of its ends to oscillate about such end within a generally sectoral closed housing 36 having a pair of end walls 38 and 40 which intersect at approximately a right angle and an arcuate wall 42 connecting the non-intersecting ends of walls 38 and 40. Vane 32 is positioned with valve stem 24 journaled in the sectoral sides of housing 36, adjacent the intersection of end walls 38 and 40, to oscillate between a position adjacent end wall 38 and a position adjacent end wall 40 in fluid-tight sliding contact with the side walls of housing 36 and with its end 44, remote from stem 24, in similar contact with arcuate wall 42, thereby dividing the sectoral chamber 36 into a pair of variable volume sub-chambers A and B. The vane 32 is adapted to oscillate between such positions through an arc of approximately 90°, and stem 24 leads to the valve through one sectoral side of housing 36 with a fluid-tight seal.

Fluid conduits 46 and 48 communicate with the interior of sectoral chamber 36 through the arcuate wall 42 adjacent end walls 38 and 40 respectively. Thus, fluid conduit 46 communicates at all times with only sub-chamber A, while fluid conduit 48 communicates at all times only with the other variable-volume sub-chamber B. Vane 32 is centrally provided with a pair of ports 50 and 52, each of which extends through vane 32 from one side to the other joining the two variable-volume chambers. Port 50 is provided with a valving device including a valve head 54 seated over port 50 on the side of vane 32 facing end wall 38, and a valve rod 56, extending through and terminating beyond port 50 in a follower 58. A coil spring 60 is disposed intermediate follower 58 and the side of vane 32 facing end wall 40 for biasing the valve head 54 to remain closed over port 50. Similarly, port 52 is provided with a valving device including a valve head 62 seated over port 52 on the side of vane 32 facing end wall 40, and a valve stem 64 extending through and terminating beyond port 52 in a follower 66. A coil spring 68 is disposed intermediate follower 66 and the side of vane 32 facing end wall 38 for biasing the valve head 62 to remain closed over port 52.

Fluid actuated motor 30 generally is of the type described in the above noted copending application of Thurland T. Wilkinson and in particular is suitable for actuating valves, such as plug valves, on which no holding pressure is required to retain them in an open or closed position. Generally it will be noted that the actuators of the above noted copending application, all of which can be utilized in hydraulic circuits to which the present invention is applicable, are positive displacement, fluid actuated motors which are capable of limited movement in either direction. They have in common the provision of an arrangement by which at the end of the stroke of the driven element in either direction a connection is established which by-passes the driven element, such as the vane, piston, rotor or other similar device.

The purpose for establishing such a connection is to sweep the motor chamber clean of any foreign material. In the illustrated motor 30 it will be thus noted when fluid pressure is delivered through conduit 46, for example, increasing the fluid pressure in chamber A and causing vane 32 to oscillate clockwise. This oscillation forces motor fluid out of chamber B, through line 48 and continues until follower 58 strikes end wall 40. Continued movement of vane 32 then causes valve head 54 to lift off port 50 allowing flow of motor fluid from line 46 through the vane 32 and chamber B to conduit 48 to sweep variable-volume chamber B clean of any accumulated foreign material. Coil spring 60 should be under weak tension sufficient to close valve head 54 only after vane 32 has been moved to the left by reversal of motor fluid flow. It will be obvious that the operation in the reverse direction is comparable.

A suitable hydraulic circuit for permitting connection of lines 46 and 48 reversibly between a hydraulic fluid pressure source and a sump, referring more particularly to FIGURE 1, will include a four way, rotary piston valve 70 to which conduit lines 46 and 48 are connected and which is mounted on a suitable control panel located above deck 12 or at some other convenient spot. Normally the hydraulic circuit will further include a source of pressured motive fluid typically including an air operated hydraulic pump 72, the discharge side of which is connected by a conduit 74 to an accumulator 76 which is connected to an output conduit 78 leading to four way valve 70. The hydraulic circuit also includes a sump 82 into which a conduit 84 connected to four way valve 70 leads. The sump drain is connected to a conduit 86 leading to the intake side of pump 72. Preferably the intake side of pump 72 is further provided with a filter and clarifier 88, preferably connected in line 86.

Valve 70 preferably has four positions, a first position in which conduits 78 and 48 are interconnected and conduits 84 and 46 are interconnected, a second position in which none of such conduits are connected, a third position in which conduits 78 and 46 are interconnected and conduits 84 and 48 are interconnected, and a fourth position (not shown) in which conduits 46 and 48 are both connected to conduit 84. The fourth position of valve 70 is desired in order that during periods of long down time expansion and contraction of the hydraulic fluid in lines 46 and 48 can be accommodated. Since pump 72 is air operated no pressure relieving by-pass from the discharge side of pump 72 back to sump 82 is required, although, if desired, such a by-pass can be incorporated, or alternatively in the second position of valve 70 provision can be made to interconnect lines 78 and 84.

Insofar as the the apparatus in FGURES 1 and 2 has been described above the construction is in accordance with the aforenoted copending application of Thurland T. Wilkinson. Thus, as indicated above, actuator 30 can be utilized to open and close valve 22 by positioning valve 70 in the first or third positions described above. Normally after valve 22 actuation has been completed in either direction unless valve 70 is returned to its second "off" position flow will continue through lines 46 and 48 to purge motor 30 and such lines until valve 70 is returned to its off position.

In accordance with the present invention an indicator 90 is provided to indicate which direction flow in lines 46 and 48 is taking place and in what position valve 22 is. To this end indicator 90 is connected either in line 46 or 48, for example, as illustrated in FIGURE 1, in line 46.

Indicator 90, referring more particularly to FIGURES 3-5, has a substantially cylindrical, stationary housing 94 which is closed at one end and open at the other. A rotor assembly 96, including a barrel 100, having the same length but a lesser diameter than the cylindrical bore 98 of housing 94, eccentrically positioned in bore 98. Barrel 100 carries a plurality of vanes 104 slidably arranged in radial slots 106 which extend the length of barrel 100 and which are spaced at equal arcuate intervals about barrel 100. Vanes 104, which are preferably eight in number, are continuously urged outwardly against the cylindrical inner wall of bore 98 by springs 108 positioned in the bottoms of slots 106 beneath vanes 104.

Barrel 100 further includes a pair of trunions 102, one coaxially disposed at each end of barrel 100. The closed end of housing 94 is provided with a suitable recess 110 for receiving one trunion 102 while a cap 111, provided to close the open end of housing 94, is similarly recessed as indicated by the reference number 109 to receive the other trunion 102, recesses 109 and 110 being so disposed when cap 111 is affixed over the open end of housing 94, for example, by machine screws 112, that barrel 100 is positioned eccentrically in bore 98 tangent to the upper portion of the inner wall of bore 98 (as seen in FIGURES 3 and 4). Except as noted below, housing 94, assembly 96 (including vanes 104 and springs 108, as well as barrel 100), cover 111 and screws 112 are constructed of brass or other non-magnetic material.

The closed end of housing 94 opposite cover plate 111 will normally be considered the front end of indicator 90, as it carries the indicating elements of indicator 90. To this end housing 94 at its closed end is provided with enlarged circular face plate 116 which is fastened to the front end of housing 94 by means of machine screws 120 or the like, preferably with the bottom of plate 116 flush with the bottom of housing 94 and with its upper portion extending substantially above the upper portion of housing 94 in order that the axis of rotation of barrel 100 will be low relative to the center of face plate 116. Again face plate 116 and screws 120 should be non-magnetic.

Face plate 116 on its side away from housing 94, that is on its front side, carries a fixed spindle 122 which is positioned at the axis of rotation of barrel 100, that is aligned with trunions 102.

A circular steel disk 124 is rotatably mounted on spindle 122 in which position it is secured by a cotter pin 123 appropriately fixed in a transverse bore at the outer end of spindle 122. Disk 124 is provided with four sectoral slots 125 of approximately 30° each and which are centered at equal arcuate intervals about disk 124. Disk 124 also has a forwardly extending hub projection 126 on which a pinion gear 128 is affixed.

Although there is no mechanical connection between them, barrel 100 is arranged to drive disk 124 by four magnets 127 inserted in the end of barrel 100 adjacent disk 124 at 90° intervals about such end at a radial distance from the center of barrel 100 less than the radius of the sectoral flanges of disk 124 formed by slots 125. Thus a magnet 127 tends to attract each flange of disk 124 such that any rotation of barrel 100 will produce a corresponding rotation of disk 124.

A spur gear 134 is mounted directly over pinion 128 in a position in which it meshes with pinion 128 and in which it is received over the end of stud bolt 120 threadedly engaged through face plate 116 with housing 94 and having a fixed collar underlying spur gear 134. Also positioned on stud bolt 120 over the fixed collar and beneath spur gear 134 is the apertured end of an indicator needle 136, the other end of which extends upwardly beyond the teeth of spur gear 134. A coil spring 138 is positioned between the collar on stud bolt 120 and indicator needle 136 urging indicator needle 136 into frictional engagement with spur gear 134. A nut 139 threadedly received on the end of stud bolt 120 holds spur gear 134, needle 136 and spring 138 loosely together such that they can rotate as a unit on the head of stud bolt 120. A pair of pins 140 and 142 are disposed on opposite sides of face plate 116 adjacent the perimeter of spur gear 134 in positions obstructing the path of travel of needle 136. Face plate 116 is appropriately labeled "open" adjacent pin 140 and "closed" adjacent pin 142.

Indicator 90 is connected in the hydraulic circuit by a pair of ports 146 and 148 in the cylindrical wall of housing 94 positioned adjacent the lower end (as seen in FIGURE 4) of housing 94 with slightly more than 45° of the cylindrical inner wall of bore 98 separating them at the bottom of bore 98. It will be apparent that fluid flow through bore 98 between ports 146 and 148 will positively drive barrel 100 which will be recognized as a sliding vane meter. To prevent jamming of the vanes, relief grooves 150 and 152 lead from the top of the inner wall of the meter down to ports 146 and 148, respectively.

Figure 2:
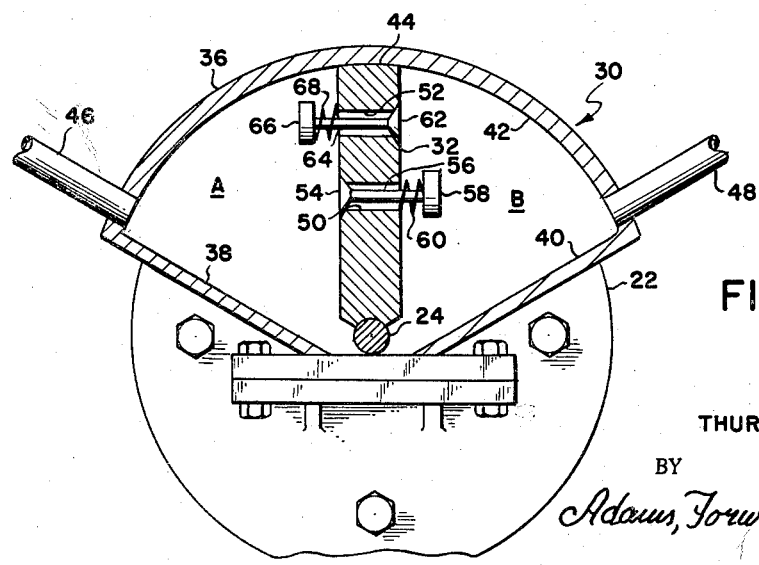
FIGURE 2 is an enlarged sectional view of a fluid motor valve actuator suitable for use with this invention.

Port 148 is connected to the side of conduit 46 leading to fluid motor 30 while port 146 is connected to the portion of conduit 46 leading to valve 70. It would be thus apparent that when valve 70 is moved to its first position, that is in which conduits 78 and 46 are interconnected and conduits 84 and 48 are interconnected, fluid flow through indicator 90 from port 146 to port 148 will drive needle 136 clockwise across the top of face plate 116 to a position engaging pin 142 while at the same time fluid flow is in a direction tending to oscillate vane 32 clockwise (as seen in FIGURE 2) driving valve 22 to closed position. It will be evident that in the third position of valve 70 the reverse operation proceeds and indicator 136 is driven toward a position abutting pin 140. The angular spacing of pins 140 and 142 relative to the axis of rotation of needle 136 is such that the movement of needle 136 across the top of face plate 116 between pins 140 and 142 is produced by a definite volume of fluid passing through the sliding vane meter portion of indicator 90, that is through bore 98. The spacing should be such that such volume is the same as the total displacement of fluid motor 30. Thus the operator at the control panel can observe the position of needle 136 to ascertain the position of valve 22. Since fluid motor 30 is designed when vane 32 has reached a limiting position at the end of a stroke to open and permit fluid to pass directly between conduits 46 and 48 in order to purge lines 46 and 48 when pointer 136 abuts a pin 140 or 142, as the case may be, the continued flow of fluid will drive gears 128 and 134, but pointer 136, since it is only loosely frictionally engaged to spur gear 134, will stop. It will thus be evident that the operator of the control panel is provided by indicator 90 not only with accurate knowledge of the condition of remotely located valve 22 but also of the condition of continued purging which can be noted by observing the continued motion of the gears. It will also be evident that the spacing of pins 140 and 142 can be varied and thus indicator 90 can be utilized to indicate the position of fluid motors through a range of sizes.

It will be observed that while the indicator 90 is described above in connection with a two line hydraulic circuit, under certain circumstances, as illustrated in the above noted copending application, a hydraulic circuit can be utilized in which a single connection is made to the common sump and a pair of separate lines connecting the ends of the actuator or other fluid motor to the hydraulic pressure source. Under other circumstances, it will be apparent that a four-line hydraulic circuit can be employed. In these last two occasions flow in the lines will always be in the same direction and accordingly indicator 90 cannot be properly operated in a reversible manner by connection in any of the lines leading to the fluid motor.

In such an instance a second four way valve can be provided between the hydraulic fluid pressure source and the control valve arranged to connect indicator 90 serially in the circuit. In this arrangement if the second four way valve is mechanically connected to be operated with the main control valve reversible flow through the indicator can be obtained which correlates with the direction of movement of the fluid motor.

Thus, for example, referring more particularly to FIGURE 6, such an arrangement is illustrated in the hydraulic circuit shown in FIGURE 1 in which the reference numerals 78 and 84 are employed to indicate the connections to the hydraulic fluid pressure source and sump, respectively, as before, the reference numerals 46 and 48 are utilized to indicate the connections to the fluid motor, as before, and the reference numeral 70 designates the four way valve of FIGURE 1. In this arrangement, however, indicator 90 has been removed from conduit 46 and a second four way valve 70', which is mechanically connected to four way valve 70 to be operated in synchronism with four way valve 70, is installed between conduit 78 and valve 70 with conduit 78 connected to one of the ports of valve 70' and a conduit 164 interconnecting another port of valve 70' and the port of valve 70 to which conduit 78 is connected in the circuit shown in FIGURE 1.

Indicator 90 is interconnected between the other pair of ports of valve 70' by means of connecting conduits 160 and 162 which are connected to ports 146 and 148 respectively of indicator 90. In the first position of valve 70', corresponding to the first position of valve 70, conduits 78 and 160 are interconnected and conduits 162 and 164 are interconnected while in the third position of valve 70' conduits 78 and 162 are interconnected and conduits 160 and 164 are interconnected.

From the preceding description it would be apparent that the arrangement shown in FIGURE 6 provides fluid flow through indicator 90 in the direction required to produce indicator movement corresponding to the direction of flow of fluid at the actuator, that is, fluid motor 30. It will be further apparent that if fluid motor 30 is one of the types described in the above noted copending Wilkinson application in which purging is through a common third line leading directly to the sump, the arrangement of FIGURE 6 permits indicator 90 to be employed to give the same indication, as before, of open and closed positions and of purging.

The claims:

1. In a hydraulic circuit including a reversible, limited movement, positive displacement motor, fluid conduits thereto between a source of pressure fluid and a sump, valve means in said fluid conduits having at least a first position for connecting said fluid pressure source and sump to said motor to drive said motor in one direction and a second position for connecting said fluid pressure source and sump to said motor to drive said motor in the reverse direction, and means associated with said motor to interconnect said lines leading to said pressure source and said sump at the end of limited movement of said motor in each direction, the improvement which includes a reversible positive displacement meter connected in said fluid circuit whereby said meter is driven by fluid flow in said circuit in one direction when said valve means is in said first position and in the reverse direction when said valve means is in said second position, a first indicator connected to said meter to be driven thereby to indicate operation of said meter and its direction, a second indicator which is slip connected to said first indicator to be driven thereby upon movement thereof, and limit means positioned to obstruct said second indicator to limit movement thereof between two positions corresponding to the amount of movement of said positive displacement meter caused by passage therethrough of fluid in quantity equal to that displaced by the total limited movement of said motor.

2. An indicator for connection in a hydraulic circuit to indicate the position of a reversible, limited movement, positive displacement motor and direction of flow in the circuit which includes a reversible, positive displacement meter for connection in the circuit with fluid flow therethrough corresponding in direction to fluid flow to said motor, a first indicator connected to said meter to be driven thereby to indicate operation of said meter and its direction, a second indicator which is slip connected to said first indicator to be driven thereby upon movement thereof, and limit means positioned to obstruct said second indicator to limit movement thereof between two positions.

References Cited in the file of this patent
UNITED STATES PATENTS

| | | |
|---|---|---|
| 2,112,466 | Maloon | Mar. 29, 1938 |
| 2,261,444 | Neubert | Nov. 4, 1941 |
| 2,665,122 | Rowland | Jan. 5, 1954 |
| 2,825,307 | Enyeart et al. | Mar. 4, 1958 |